United States Patent Office 3,629,466
Patented Dec. 21, 1971

3,629,466
SYNERGISTIC MIXTURES CONTAINING PENTACHLOROPHENOL
Bruno Sander, Ludwigshafen, Ernst-Heinrich Pommer, Limburgerhof, and Werner Helmut Clad and Otto Wittmann, Ludwigshafen, Germany, assignors to Badische Anilin- & Soda-Fabrik Aktiengesellschaft, Ludwigshafen (Rhine), Germany
No Drawing. Filed Jan. 27, 1969, Ser. No. 794,366
Claims priority, application Germany, Feb. 3, 1968, P 16 67 937.1
Int. Cl. A01n 9/20
U.S. Cl. 424—325      4 Claims

ABSTRACT OF THE DISCLOSURE

A new mixture of
(a) pentachlorophenol or its salt and
(b) the salt of an N-nitroso-N-organylhydroxylamine which has valuable and new properties, and a process for controlling fungi with this mixture. The mixture has a strong fungicidal action and is particularly suited for the prevention of fungus infections.

---

The present invention relates to fungicides which contain a mixture of pentachlorophenol and N-nitroso-N-organylhydroxylamine or their salts.

It is known to use pentachlorophenol and sodium pentachlorophenol for controlling fungi; however, their action is unsatisfactory.

An object of the invention is a new and valuable mixture of
(a) pentachlorophenol or its salt and
(b) the salt of an N-nitroso-N-organylhydroxylamine.

This new mixture has valuable fungicidal properties.
A further object of the invention is a process for controlling fungi with the aid of a mixture of
(a) pentachlorophenol or its salt and
(b) the salt of an N-nitroso-N-organylhydroxylamine Even fungi which are difficult to combat, for instance those on inanimate objects such as masonry, wood, leather and textiles, can be controlled with this mixture. These and other objects of the invention are achieved by a mixture of
(a) pentachlorophenol or its salt and
(b) the salt of an N-nitroso - N - organylhydroxylamine which has a good fungicidal action. The action against ligniperdous fungi, such as *Coniophora cerebella*, or against those fungi causing mold or mildew, such as *Aspergillus niger* and *Trichoderma viride*, is particularly good.

Especially effective salts of N-nitroso-N-organylhydroxylamines are the salts of N-nitroso-N-cycloalkylhydroxylamines and particularly the salts of N-nitroso-N-cyclohexylhydroxylamine.

By salts we mean first and foremost the alkali metal (sodium, potassium), alkaline earth metal (calcium, magnesium) and copper salts and also those salts having an organic cation (e.g. cyclohexylammonium salts or benzylammonium salts).

The components (a) and (b) may be mixed together in all proportions.

The preferred weight ratio of components (a) and (b) is from 2:1 to 10:1.

We have found that the application rates for achieving a good fungicidal action with the mixture according to the invention consisting of components (a) and (b) are much smaller than when one of components (a) or (b) is used alone. As regards the fungicidal action, components (a) and (b) act in synergism with one another.

The manufacture of the components is known from the literature. Pentachlorophenol may be prepared by hydrolysis of hexachlorobenzene with caustic soda solution (German Pat. No. 1,139,126) or by chlorination of phenol (German Pat. No. 888,701).

The N-nitroso-N-organylhydroxylamines may be prepared either from cyclohexane and nitrogen monoxide in the presence of light and hydrochloric acid or by the process described in British Pat. No. 815,537.

The mixtures according to the invention may be applied as solutions, emulsions, suspensions or dusts. The form of application depends entirely on the purpose for which the mixtures are being used; in any case it should ensure a fine distribution of the active ingredient.

Aqueous formulations may be prepared direct from the salts, if they are water-soluble, or from emulsion concentrates, pastes or wettable powder by adding water. To prepare emulsions the ingredients as such or dissolved in a solvent may be homogenized in water by means of wetting or dispersing agents such as polyethylene oxide adducts. Concentrates which are suitable for dilution with water may be prepared from active ingredient, emulsifying or dispersing agent and possibly solvent.

Dusts may be prepared by mixing or grinding the active ingredients, with a solid carrier such as clay, diatomite, talc or fertilizer.

Especially the sodium salts of components (a) and (b) may be used in the form of their aqueous solutions.

The mixture according to the invention may be used for the protection of predominantly inanimate objects (masonry, wood, leather and textiles) against attack and destruction by fungi.

The mixture according to the invention has proved itself particularly for the fungicidal protection of wood-base materials such as chipboard, plywood and wood fiber materials. The mixture may be added direct to the aqueous binders in the production of these wood-base materials in the form of a powder, if desired together with wetting agents. Preferentially, however, the mixture is first dissolved in solvent mixtures compatible with glue; these concentrates are then distributed in the aqueous binder mixtures during the production of the wood-base materials. When compressed, the liquid phase with the mixture penetrates the wood, thus achieving an even distribution of the mixture in the wood.

The following examples demonstrate the superiority of the fungicidal properties of the mixture according to the invention over those of known mixtures.

EXAMPLES

Pentachlorophenol or sodium pentachlorophenol (component (a)) and the calcium salt of N-nitroso-N-cyclohexylhydroxylamine (component (b)) are added, in a large variety of ratios or as single components, directly as a powder or dissolved in an ethylene glycol/1,3-dioxolane or an ethylene glycol monomethyl ether/1,3-dioxolane mixture to a wood glue based on a phenol-formaldehyde polycondensate (molar ratio of phenol to formaldehyde of 1:2) which contains 48% of solids (40% polycondensate and 8% sodium hydroxide) in aqueous solution.

Wood chips are glued with these binder mixtures, 8 parts of binder (dry weight) being used per 100 parts of chips.

The chips coated with binder are compressed into boards of 18 mm. thickness at a temperature of 160° C.

To determine the resistance to mold fungus, chipboard specimens (25 x 17 x 100 mm.) are placed in Petri culture dishes on a 5% malt agar which has been artificially inoculated with spores of the mold fungi *Aspergillus niger* or *Trichoderma viride*. The Petri dishes containing the chipboard specimens are incubated for a period of 14 days at a temperature of 30° C. The extent of the fungus development on the chipboard specimens and of the fungus growth on the nutrient agar is then ascertained.

The results may be seen from Table 1.

To determine the resistance to ligniperdous fungi, chipboard specimens (50 x 25 x 18 mm.), prepared as described above, are placed on a malt agar covered with the ligniperdous fungus Coniophora cerebella. The dishes are incubated for 12 weeks at 22° C. and then the extent of the fungus development on the specimens is ascertained.

The results may be seen from Table 2.

TABLE 1

| Sample number | Percentage (by weight) of the active ingredient (with reference to the dry wood) contained in the specimen | | Extent of mold fungus development after 14 days | |
|---|---|---|---|---|
| | Component A | Component B | Aspergillus niger | Trichoderma viride |
| 1 | 0.5 SPCP | 0.1 Ca salt | − | − |
| 2 | 0.5 PCP | 0.1 Ca salt | − | − |
| 3 | 0.5 SPCP | | ++ | ++ |
| 4 | 1.0 SPCP | | + | + |
| 5 | | 0.1 Ca salt | +++ | +++ |
| 6 | | 0.2 Ca salt | ++ | +++ |
| 7 (control) | | | +++ | +++ |

SPCP = Sodium salt of pentachlorophenol.
PCP = Pentachlorophenol.
Ca salt = Calcium salt of nitroso-N-cyclohexylhydroxylamine.
− = No fungus growth on the specimen.
+ = Traces of fungus development.
++ = Fairly strong fungus development.
+++ = Unchecked fungus development.

TABLE 2

| Sample number | Percentage (by weight) of the active ingredient (with reference to the dry wood) contained in the specimen | | Extent of the development of Coniophora cerebella on the specimens after 12 weeks |
|---|---|---|---|
| | Component A | Component B | |
| 1 | 1.0 SPCP | 0.1 Ca salt | − |
| 2 | 1.0 SPCP | 0.2 Ca salt | − |
| 3 | 1.0 PCP | 0.2 Ca salt | − |
| 4 | 1.0 SPCP | | +++ |
| 5 | 2.0 SPCP | | ++ |
| 6 | | 0.1 Ca salt | +++ |
| 7 | | 0.2 Ca salt | ++ |
| 8 (control) | | | +++ |

− = No fungus mycelium on the specimen.
+ = Fungus mycelium only present on the speciment at the points of contact.
++ = Specimen covered to a large extent with fungus mycelium.
+++ = Specimen completely overgrown with fungus mycelium.
SPCP = Sodium salt of pentachlorophenol.
PCP = Pentachlorophenol.
Ca salt = Calcium salt of nitrose-N-cyclohexylhydroxylamine.

We claim:
1. A fungicidal mixture of sodium pentachlorophenol and calcium nitroso-N-cyclohexyl hydroxylamine in a weight ratio of 5:1 or 10:1.

2. A fungicidal mixture of pentachlorophenol and calcium nitroso-N-cyclohexyl hydroxylamine in a weight ratio of 5:1.

3. A process for controlling fungi growth on articles which comprises applying to the article a fungicidal amount of a fungicidal mixture of sodium pentachlorophenol and calcium nitrose-N-cyclohexyl hydroxylamine in a weight ratio of 5:1 or 10:1 or a fungicidal mixture of pentachlorophenol and calcium nitroso-N-cyclohexyl hydroxylamine in a weight ratio of 5:1.

4. A process as claimed in claim 3 wherein said article is chipboard produced by the compression of a mixture of wood chips and a binder, and wherein said fungicidal mixture is dispersed in said binder prior to compression of said mixture.

References Cited

UNITED STATES PATENTS

| 3,200,003 | 8/1965 | Bescher | 424—347 |
| 3,386,881 | 6/1968 | Abramitis | 424—325 |

FOREIGN PATENTS

| 815,538 | 6/1959 | Great Britain | 424—325 |

ALBERT T. MEYERS, Primary Examiner

N. A. DREZIN, Assistant Examiner

U.S. Cl. X.R.

264—109; 424—29, 347